United States Patent
Liu et al.

(10) Patent No.: US 9,138,692 B2
(45) Date of Patent: *Sep. 22, 2015

(54) POLYMER MEMBRANES PREPARED FROM AROMATIC POLYIMIDE MEMBRANES BY THERMAL TREATING AND UV CROSSLINKING

(75) Inventors: Chunqing Liu, Schaumburg, IL (US); Peter K. Coughlin, Mundelein, IL (US); Man-Wing Tang, Cerritos, CA (US); Raisa Minkov, Skokie, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 611 days.

This patent is subject to a terminal disclaimer.

(21) Appl. No.: 13/547,313

(22) Filed: Jul. 12, 2012

(65) Prior Publication Data
US 2012/0276300 A1  Nov. 1, 2012

Related U.S. Application Data

(62) Division of application No. 13/165,939, filed on Jun. 22, 2011, now Pat. No. 8,241,501, which is a division of application No. 12/412,649, filed on Mar. 27, 2009, now Pat. No. 8,132,677.

(51) Int. Cl.
| | |
|---|---|
| *B01D 71/62* | (2006.01) |
| *B01D 67/00* | (2006.01) |
| *B01D 53/22* | (2006.01) |
| *C08G 73/10* | (2006.01) |
| *C08G 73/16* | (2006.01) |
| *C08L 79/08* | (2006.01) |

(52) U.S. Cl.
CPC .............. *B01D 71/62* (2013.01); *B01D 53/228* (2013.01); *B01D 67/0093* (2013.01); *C08G 73/1039* (2013.01); *C08G 73/1042* (2013.01); *C08G 73/1046* (2013.01); *C08G 73/1064* (2013.01); *C08G 73/16* (2013.01); *C08L 79/08* (2013.01); *B01D 2323/08* (2013.01); *B01D 2323/30* (2013.01); *B01D 2323/345* (2013.01); *Y02C 20/20* (2013.01)

(58) Field of Classification Search
None
See application file for complete search history.

(56) References Cited

U.S. PATENT DOCUMENTS

| 4,847,350 A | 7/1989 | Harris |
| 5,749,943 A | 5/1998 | Shimazu et al. |
| 2004/0097695 A1 | 5/2004 | Yoon |
| 2008/0290022 A1 | 11/2008 | Sanchez et al. |

FOREIGN PATENT DOCUMENTS

GB    2211193 A  *  6/1989

OTHER PUBLICATIONS

Park et al, "Polymers with cavities tuned for fast slective transportt of small molecules and ions", Science, vol. 318, Oct. 12, 2007.*

* cited by examiner

*Primary Examiner* — Krishnan S Menon

(57) ABSTRACT

The present invention discloses a new type of high performance polymer membranes prepared from aromatic polyimide membranes by thermal treating and crosslinking and methods for making and using these membranes. The polymer membranes were prepared from aromatic polyimide membranes by thermal treating under inert atmosphere followed by crosslinking preferably by using a UV radiation source. The aromatic polyimide membranes were made from aromatic polyimide polymers comprising both pendent hydroxy functional groups ortho to the heterocyclic imide nitrogen and cross-linkable functional groups in the polymer backbone. The membranes showed significantly improved selectivity and permeability for gas separations compared to the aromatic polyimide membranes without any treatment. The membranes can be fabricated into any convenient geometry and are not only suitable for a variety of liquid, gas, and vapor separations, but also can be used for other applications such as for catalysis and fuel cell applications.

3 Claims, No Drawings

POLYMER MEMBRANES PREPARED FROM AROMATIC POLYIMIDE MEMBRANES BY THERMAL TREATING AND UV CROSSLINKING

CROSS-REFERENCE TO RELATED APPLICATION

This application is a Division of copending application Ser. No. 13/165,939 filed Jun. 22, 2011, which is a Division of application Ser. No. 12/412,649 filed Mar. 27, 2009, now U.S. Pat. No. 8,132,677, the contents of which are hereby incorporated by reference in their entirety.

BACKGROUND OF THE INVENTION

This invention pertains to a new type of high performance polymer membranes prepared from aromatic polyimide membranes by thermal treating and UV crosslinking and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex™ cellulose acetate polymeric membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. However, polymers which are more permeable are generally less selective than are less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success. In addition, traditional polymer membranes also have limitations in terms of thermal stability and contaminant resistance.

Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. For example, it has been found in practice that polymer membrane performance can deteriorate quickly. The primary cause of loss of membrane performance is liquid condensation on the membrane surface. Condensation is prevented by providing a sufficient dew point margin for operation, based on the calculated dew point of the membrane product gas. UOP's MemGuard™ system, a pretreatment regenerable adsorbent system that uses molecular sieves, was developed to remove water as well as heavy hydrocarbons ranging from $C_{10}$ to $C_{35}$ from the natural gas stream, hence, to lower the dew point of the stream. The selective removal of heavy hydrocarbons by a pretreatment system can significantly improve the performance of the membranes. Although these pretreatment systems can effectively remove heavy hydrocarbons from natural gas streams to lower their dew point, the cost is quite significant. Some projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Removal of the pretreatment system from the membrane system has great economical impact especially to offshore projects.

High performance polymers such as polyimides (PIs), poly (trimethylsilylpropyne) (PTMSP), and polytriazole have been developed recently to improve membrane selectivity, permeability, and thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). These high performance polymeric membrane materials, however, have reached a limit in their permeability-selectivity trade-off relationship. The membranes having high permeabilities generally have low selectivities and vice versa. In addition, gas separation processes based on the use of glassy solution-diffusion membranes frequently suffer from plasticization of the stiff polymer matrix by the sorbed penetrant molecules such as $CO_2$ or $C_3H_6$. Plasticization of the polymer as represented by the membrane structure swelling and significant increase in the permeabilities of all components in the feed occurs above the plasticization pressure when the feed gas mixture contains condensable gases.

Barsema et al. reported that heat treatment of Matrimid® membranes in an inert atmosphere can alter the membrane properties as well as molecular structure. See Barsema, et al., J. MEMBR. SCI, 238: 93 (2004). These heat-treated polyimide membranes showed improved plasticization resistance. However, these heat-treated polyimide membranes did not show significant improvement in selectivity and permeability compared to the untreated polyimide membranes.

In US 2008/0300336 A1, it was reported that the use of UV crosslinking did succeed in improving the selectivities of certain mixed matrix membranes that contain molecular sieves that function to improve the permeability and selectivity of the membranes. However, it was necessary to both crosslink the polymer and to add the molecular sieves to obtain the improved levels of performance reported therein. None of the membranes reported in US 2008/0300336 A1 exhibited $CO_2$ permeability higher than 200 Barrer and $CO_2/CH_4$ selectivity over 40 at 50° C. testing temperature for the removal of $CO_2$ from natural gas. It is highly desired to have improved polymeric membranes that do not contain molecular sieves both to avoid the need to disperse the molecular sieves and to eliminate any problems caused by the lack of adhesion between the polymer and the molecular sieves.

Therefore, a new polymer membrane possessing both high permeability and high selectivity is still needed.

The present invention provide a new type of high performance polymer membranes overcoming the problems of the prior art polymer membranes. These new polymer membranes have both high selectivity and high permeability (or permeance), as well as high thermal stability.

SUMMARY OF THE INVENTION

This invention pertains to a new type of high performance polymer membranes prepared from aromatic polyimide membranes by thermal treating and UV crosslinking and methods for making and using these membranes.

The high performance polymer membranes described in the current invention are prepared from aromatic polyimide membranes by thermal treating under inert atmosphere (e.g., nitrogen, argon or vacuum) followed by UV crosslinking using a UV radiation source. The aromatic polyimide membranes described in the current invention were made from aromatic polyimide polymers comprising both UV crosslinkable functional groups in the polymer backbone and pendent hydroxy functional groups ortho to the heterocyclic imide nitrogen. The novel high performance polymer membranes prepared from aromatic polyimide membranes by thermal treating and UV crosslinking showed significantly improved selectivity and permeability for gas separations compared to the aromatic polyimide membranes without any treatment. It is believed that the improvement obtained in both selectivity and permeability after thermal treating and UV crosslinking is not only related to the reaction between the heterocyclic imide groups and the pendent hydroxy groups ortho to the heterocyclic imide nitrogen, but also related to the formation of three dimensional crosslinked network structures due to the crosslinking of the polymer chain segments to each other through possible direct covalent bonds.

The high performance polymer membranes of the present invention overcome the problems of the prior art polymer membranes with the advantages of high selectivity, high permeability (or permeation), high thermal stability, and stable flux and sustained selectivity over time by resistance to solvent swelling, plasticization and hydrocarbon contaminants.

The present invention provides a method for the production of the high performance polymer membrane by: 1) preparing an aromatic polyimide polymer membrane from an aromatic polyimide polymer comprising pendent hydroxy groups ortho to the heterocyclic imide nitrogen and UV crosslinkable functional groups (e.g., carbonyl group) in the polymer backbone; 2) thermal treating the aromatic polyimide polymer membrane by heating between 300° and 600° C. under inert atmosphere, such as argon, nitrogen, or vacuum; and 3) UV crosslinking the thermal-treated aromatic polyimide polymer membrane from step 2) by UV radiation. In some cases a membrane post-treatment step can be added after step 3) by coating the selective layer surface of the both thermal-treated and UV-treated aromatic polyimide polymer membrane with a thin layer of high permeability material such as a polysiloxane, a fluoro-polymer, a thermally curable silicone rubber, or a UV radiation curable epoxy silicone.

The new high performance polymer membranes prepared from aromatic polyimide membranes by thermal treating and UV crosslinking in the present invention can have either a nonporous symmetric structure or an asymmetric structure with a thin nonporous dense selective layer supported on top of a porous support layer. The new high performance polymer membranes of the present invention be fabricated into any convenient geometry such as flat sheet (or spiral wound), disk, tube, hollow fiber, or thin film composite.

The invention provides a process for separating at least one gas or liquid from a mixture of gases or liquids using the polymer membranes prepared from aromatic polyimide membranes by thermal treating and UV crosslinking described in the present invention, the process comprising: (a) providing a polymer membrane prepared from an aromatic polyimide membrane by thermal treating and UV crosslinking which is permeable to said at least one gas or liquid; (b) contacting the mixture on one side of the polymer membrane prepared from the aromatic polyimide membrane by thermal treating and UV crosslinking to cause said at least one gas or liquid to permeate the membrane; and (c) removing from the opposite side of the membrane a permeate gas or liquid composition comprising a portion of said at least one gas or liquid which permeated said membrane.

The novel high performance polymer membranes prepared from aromatic polyimide membranes by thermal treating and UV crosslinking showed dramatically improved selectivities and permeabilities for a wide range of separations such as for $CO_2/CH_4$, $H_2/CH_4$, $O_2/N_2$ and propylene/propane separations. For example, the new polymer membrane prepared from thermal treating and UV crosslinking of the poly[3,3', 4,4'-benzophenonetetracarboxylic dianhydride-2,2-bis(3-amino-4-hydroxyphenyl)-hexafluoropropane] (poly(BTDA-APAF)) polyimide membrane showed $CO_2$ permeability ($P_{CO2}$) of 220 Barrer and $CO_2/CH_4$ selectivity ($\alpha_{CO2/CH4}$) of 48.4 for $CO_2/CH_4$ separation compared to the untreated poly (BTDA-APAF)) polyimide membrane with $P_{CO2}$ of 5.92 Barrer and $\alpha_{CO2/CH4}$ of 32.5.

The new high performance polymer membranes of the present invention are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

The present invention involves a new type of high performance polymer membranes prepared from aromatic polyimide membranes by thermal treating and UV crosslinking and methods for making and using these membranes.

The high performance polymer membranes of the present invention overcome the problems of the prior art polymer membranes with the advantages of high selectivity, high permeability (or permeation), high thermal stability, and stable flux and sustained selectivity over time by resistance to solvent swelling, plasticization and hydrocarbon contaminants.

The high performance polymer membranes described in the current invention are prepared from aromatic polyimide membranes by thermal treating followed by UV crosslinking. The aromatic polyimide membranes described in the current invention were prepared from aromatic polyimide polymers comprising both UV crosslinkable functional groups such as benzophenone group in the polymer backbone and pendent hydroxy functional groups ortho to the heterocyclic imide nitrogen. The thermal treatment and UV cross-linking offer the aromatic polyimide membranes significantly improved selectivity, permeability, as well as chemical and thermal stabilities compared to the untreated aromatic polyimide membranes. It is believed that the performance improvement after thermal treating and UV crosslinking is not only related to the reaction between the heterocyclic imide groups and the pendent hydroxy groups ortho to the heterocyclic imide nitrogen, but also related to the formation of three dimensional crosslinked network structure due to the crosslinking of the polymer chain segments to each other through possible direct covalent bonds.

The present invention provides a method for the production of the high performance polymer membrane by: 1) preparing an aromatic polyimide polymer membrane from an aromatic polyimide polymer comprising pendent hydroxy groups ortho to the heterocyclic imide nitrogen and UV crosslinkable functional groups (e.g., carbonyl group) in the polymer backbone; 2) thermal treating the aromatic polyimide polymer membrane; and 3) UV crosslinking the thermal-treated aromatic polyimide polymer membrane from step 2). In some cases a membrane post-treatment step can be added after step 3) by coating the selective layer surface of the both thermal-treated and UV-treated aromatic polyimide polymer membrane with a thin layer of high permeability material such as a polysiloxane, a fluoro-polymer, a thermally curable silicone rubber, or a UV radiation curable epoxy silicone.

The thermal treatment for the aromatic polyimide polymer membranes is conducted by heating the membrane between 300° and 600° C. under inert atmosphere, such as argon, nitrogen, or vacuum. It is proposed that there is an irreversible molecular rearrangement reaction between the heterocyclic imide groups and the pendent hydroxy groups ortho to the heterocyclic imide nitrogen during the thermal treatment process. The UV crosslinking of the thermal-treated aromatic polyimide polymer membranes is done by irradiating the membrane with a UV radiation source. It is believed that this UV crosslinking step results in the formation of three dimensional crosslinked network structures due to the crosslinking of the polymer chain segments to each other through possible direct covalent bonds.

The aromatic polyimide polymers comprising both UV crosslinkable functional groups and pendent hydroxy functional groups that are used for the preparation of the new high performance polymer membranes in the present invention comprise a plurality of first repeating units of a formula (I), wherein said formula (I) is:

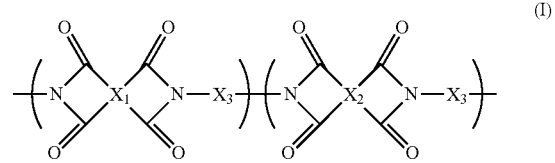

where -$X_1$- of said formula (I) is

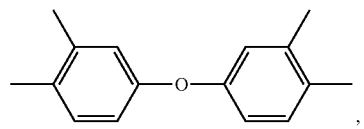

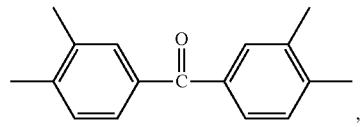

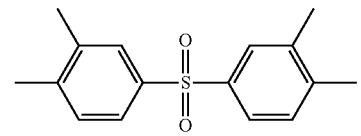

or mixtures thereof, -$X_2$- of said formula (I) is either the same as -$X_1$- or is selected from

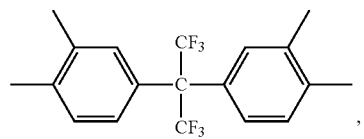

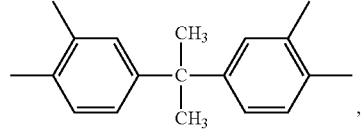

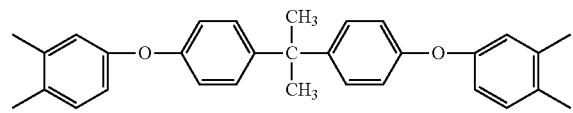

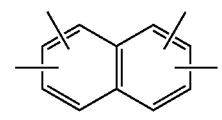

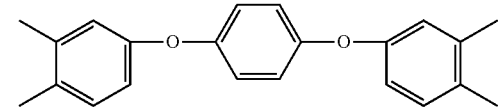

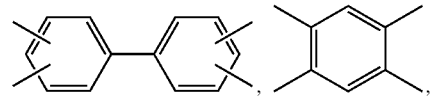

-continued

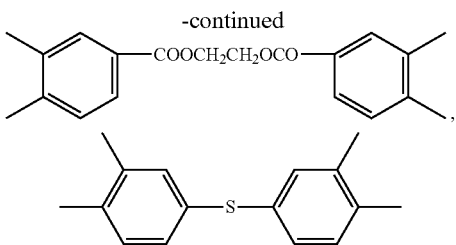

or mixtures thereof, $-X_3-$ of said formula (I) is

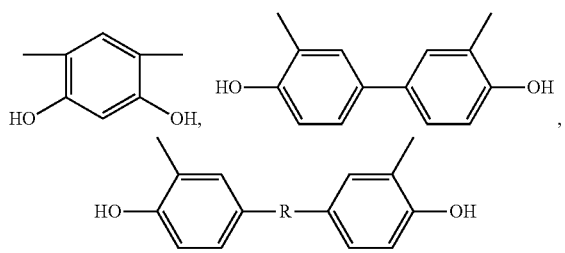

or mixtures thereof, -R- is

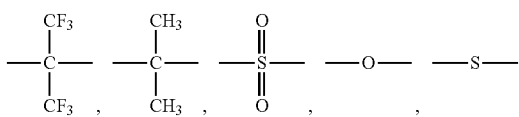

or mixtures thereof.

Some preferred aromatic polyimide polymers comprising both UV crosslinkable functional groups and pendent hydroxy functional groups that are used for the preparation of the new high performance polymer membranes in the present invention include, but are not limited to, poly[3,3',4,4'-benzophenonetetracarboxylic dianhydride-2,2-bis(3-amino-4-hydroxyphenyl)-hexafluoropropane] (poly(BTDA-APAF)), poly[4,4'-oxydiphthalic anhydride-2,2-bis(3-amino-4-hydroxyphenyl)-hexafluoropropane] (poly(ODPA-APAF)), poly(3,3',4,4'-benzophenonetetracarboxylic dianhydride-3,3'-dihydroxy-4,4'-diamino-biphenyl) (poly(BTDA-HAB)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

The aromatic polyimide polymers comprising both UV crosslinkable functional groups and pendent hydroxy functional groups that are used for the preparation of the new high performance polymer membranes in the present invention are synthesized from diamine monomers and dianhydride monomers in polar solvents such as 1-methyl-2-pyrrolidone (NMP) or N,N-dimethylacetamide (DMAc) by a two-step process involving the formation of the poly(amic acid)s followed by a solution imidization or a thermal imidization. Acetic anhydride is used as the dehydrating agent and pyridine (or triethylamine) is used as the imidization catalyst for the solution imidization reaction.

The aromatic polyimide membrane in the present invention can be fabricated into a membrane with nonporous symmetric thin film geometry from the aromatic polyimide polymer comprising UV cross-linkable functional groups and pendent hydroxy functional groups ortho to the heterocyclic imide nitrogen in the polymer backbone by casting a homogeneous aromatic polyimide solution on top of a clean glass plate and allowing the solvent to evaporate slowly inside a plastic cover for at least 12 hours at room temperature. The membrane is then detached from the glass plate and dried at room temperature for 24 hours and then at 200° C. for at least 48 hours under vacuum.

The aromatic polyimide membrane in the present invention can also be fabricated by a method comprising the steps of: dissolving the aromatic polyimide polymer in a solvent to form a solution of the polyimide material; contacting a porous membrane support (e.g., a support made from inorganic ceramic material) with said solution; and evaporating the solvent to provide a thin selective layer comprising the aromatic polyimide polymer material on the supporting layer.

The aromatic polyimide membrane in the present invention can also be fabricated as an asymmetric membrane with flat sheet or hollow fiber geometry by phase inversion followed by direct air drying through the use of at least one drying agent which is a hydrophobic organic compound such as a hydrocarbon or an ether (see U.S. Pat. No. 4,855,048). The aromatic polyimide membrane in the present invention can also be fabricated as an asymmetric membrane with flat sheet or hollow fiber geometry by phase inversion followed by solvent exchange methods (see U.S. Pat. No. 3,133,132).

The solvents used for dissolving the aromatic polyimide polymer comprising both UV crosslinkable functional groups and pendent hydroxy functional groups are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, others known to those skilled in the art and mixtures thereof.

The aromatic polyimide polymer membrane in the present invention was thermally treated between 300° and 600° C. under inert atmosphere, such as argon, nitrogen, or vacuum. The thermally treated aromatic polyimide polymer membrane was then further UV treated to crosslink the membrane by irradiating the membrane with a UV radiation source. One method to do the UV treatment is to use a UV lamp from a predetermined distance and for a period of time selected based upon the separation properties sought. For example, the thermally treated aromatic polyimide polymer membrane can be further UV treated by exposure to UV radiation using 254 nm wavelength UV light generated from a UV lamp with 1.9 cm (0.75 inch) distance from the membrane surface to the UV lamp and a radiation time of 30 minutes at less than 50° C. The UV lamp described here is a low pressure, mercury arc immersion UV quartz 12 watt lamp with 12 watt power supply from Ace Glass Incorporated. Optimization of the conditions for the UV treatment should promote the tailoring of the membranes for a wide range of gas and liquid separations with improved permeation properties and environmental stability. The UV cross-linking degree of the thermally treated aromatic polyimide polymer membrane can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 0.5 minute to 1 hour. More preferably, the distance from the UV lamp to the membrane surface is in the range of 1.3 to 5.1 cm (0.5 to 2 inches) with a UV light provided from 12 watt to 450 watt low pressure or medium pressure mercury arc lamp, and the UV radiation time is in the range of 0.5 to 40 minutes.

In some cases a membrane post-treatment step can be added after the thermal treating and UV crosslinking steps by introducing a thin layer of high permeability material such as a polysiloxane, a fluoro-polymer, a thermally curable silicone rubber, or a UV radiation curable epoxy silicone. The coating filling the surface pores and other imperfections comprising voids (see U.S. Pat. No. 4,230,463; U.S. Pat. No. 4,877,528; U.S. Pat. No. 6,368,382).

The new high performance polymer membranes prepared from the aromatic polyimide membranes by thermal treating and UV crosslinking described in the present invention can have either a nonporous symmetric structure or an asymmetric structure with a thin nonporous dense selective layer supported on top of a porous support layer. The porous support can be made from the same aromatic polyimide material or a different type of material with high thermal stability. The new high performance polymer membranes of the present invention can be fabricated into any convenient geometry such as flat sheet (or spiral wound), disk, tube, hollow fiber, or thin film composite.

The invention provides a process for separating at least one gas or liquid from a mixture of gases or liquids using the new polymer membranes prepared from the aromatic polyimide membranes by thermal treating and UV crosslinking described in the present invention, the process comprising: (a) providing the new polymer membrane prepared from the aromatic polyimide membrane by thermal treating and UV crosslinking which is permeable to said at least one gas or liquid; (b) contacting the mixture on one side of the new polymer membrane prepared from the aromatic polyimide membrane by thermal treating and UV crosslinking to cause said at least one gas or liquid to permeate the membrane; and (c) removing from the opposite side of the membrane a permeate gas or liquid composition comprising a portion of said at least one gas or liquid which permeated said membrane.

The new polymer membranes prepared from the aromatic polyimide membranes by thermal treating and UV crosslinking of the present invention are especially useful in the purification, separation or adsorption of a particular species in the liquid or gas phase. In addition to separation of pairs of gases, these high performance polymer membranes may, for example, can be used for the desalination of water by reverse osmosis or for the separation of proteins or other thermally unstable compounds, e.g. in the pharmaceutical and biotechnology industries. The new polymer membranes prepared from the aromatic polyimide membranes by thermal treating and UV crosslinking described in the present invention may also be used in fermenters and bioreactors to transport gases into the reaction vessel and transfer cell culture medium out of the vessel. Additionally, these new polymer membranes may be used for the removal of microorganisms from air or water streams, water purification, ethanol production in a continuous fermentation/membrane pervaporation system, and in detection or removal of trace compounds or metal salts in air or water streams.

The new polymer membranes prepared from the aromatic polyimide membranes by thermal treating and UV crosslinking described in the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the new polymer membranes prepared from the aromatic polyimide membranes by thermal treating and UV crosslinking described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the membranes of the present invention will range from about −20° to about 100° C., and most preferably, the effective operating temperature of the membranes of the present invention will range from about 25° to about 100° C.

The new polymer membranes prepared from the aromatic polyimide membranes by thermal treating and UV crosslinking described in the current invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these new polymer membranes prepared from the aromatic polyimide membranes by thermal treating and UV crosslinking may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The new polymer membranes prepared from the aromatic polyimide membranes by thermal treating and UV crosslinking may incorporate a species that adsorbs strongly to certain gases (e.g. cobalt porphyrins or phthalocyanines for $O_2$ or silver (I) for ethane) to facilitate their transport across the membrane.

The new polymer membranes prepared from the aromatic polyimide membranes by thermal treating and UV crosslinking also have immediate application to concentrate olefin in a paraffin/olefin stream for olefin cracking application. For example, the new polymer membranes prepared from the aromatic polyimide membranes by thermal treating and UV crosslinking can be used for propylene/propane separation to increase the concentration of the effluent in a catalytic dehydrogenation reaction for the production of propylene from propane and isobutylene from isobutane. Therefore, the number of stages of propylene/propane splitter that is required to get polymer grade propylene can be reduced. Another application for the new polymer membranes prepared from the aromatic polyimide membranes by thermal treating and UV crosslinking is for separating isoparaffin and normal paraffin in light paraffin isomerization and MaxEne™, a process for enhancing the concentration of normal paraffin (n-paraffin) in the naphtha cracker feedstock, which can be then converted to ethylene.

The new polymer membranes prepared from the aromatic polyimide membranes by thermal treating and UV crosslinking can also be operated at high temperature to provide the sufficient dew point margin for natural gas upgrading (e.g, $CO_2$ removal from natural gas). The new polymer membrane prepared from the aromatic polyimide membrane by thermal treating and UV crosslinking can be used in either a single stage membrane or as the first or/and second stage membrane in a two stage membrane system for natural gas upgrading. The new polymer membranes of the present invention have high selectivity, high permeance, and high thermal and chemical stabilities that allow the membranes to be operated without a costly pretreatment system. Hence, a costly membrane pretreatment system such as a MemGuard™ system will not be required in the new process containing the new polymer membrane system. Due to the elimination of the pretreatment system and the significant reduction of membrane area, the new process can achieve significant capital cost saving and reduce the existing membrane footprint.

These new polymer membranes prepared from the aromatic polyimide membranes by thermal treating and UV crosslinking may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these new polymer membranes prepared from the aromatic polyimide membranes by thermal treating and UV crosslinking is the deep desulfurization of gasoline and diesel fuels by a pervaporation membrane process similar to the process described in U.S. Pat. No. 7,048,846, incorporated by reference herein in its entirety. The new polymer membranes prepared from the aromatic polyimide membranes by thermal treating and UV crosslinking that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the new polymer membranes prepared from the aromatic polyimide membranes by thermal treating and UV crosslinking include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The new polymer membranes prepared from the aromatic polyimide membranes by thermal treating and UV crosslinking may be used for separation of organic molecules from water (e.g. ethanol and/or phenol from water by pervaporation) and removal of metal and other organic compounds from water.

The new polymer membranes prepared from the aromatic polyimide membranes by thermal treating and UV crosslinking described in the current invention have immediate applications for the separation of gas mixtures including carbon dioxide removal from natural gas. The new polymer membrane permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

An additional application of the new polymer membranes prepared from the aromatic polyimide membranes by thermal treating and UV crosslinking is as the separator in chemical reactors to enhance the yield of equilibrium-limited reactions by selective removal of a specific byproduct or product.

Yet another application of the new polymer membranes prepared from the aromatic polyimide membranes by thermal treating and UV crosslinking described in the current invention is as the catalytic polymeric membranes by loading metal catalysts or polymer-anchored metal catalysts, or molecular sieve catalysts to the new polymer membranes prepared from the aromatic polyimide membranes by thermal treating and UV crosslinking. These new polymer membranes prepared from the aromatic polyimide membranes by thermal treating and UV crosslinking are suitable for a variety of catalysis applications that would be of interest in the catalysis industry such as selective hydrogenation reactions to remove feed or product impurities, solid acid motor fuel alkylation (alkylene), ethylbenzene and cumene alkylation, detergent alkylation, $C_3$-$C_5$ light olefin oligomerization, disproportionation and transalkylation processes to convert toluene to benzene and xylenes, selective conversion of ethyl benzene to paraxylene isomer, and others known to those of ordinary skill in the art. The control of adsorption and diffusion properties by tailoring the characteristics of both the new polymer membranes prepared from the aromatic polyimide membranes by thermal treating and UV crosslinking and catalyst components can greatly improve process efficiency that can only be achieved in systems of liquid acids or bases, where great efficiency is achieved via great partition of one reactant relative to others or the reactants relative to product. The new polymer membranes prepared from the aromatic polyimide membranes by thermal treating and UV crosslinking described in the current invention possess many advantages over traditional catalysts for the above-mentioned catalysis applications.

As an example, the advantages of these new polymer membranes prepared from the aromatic polyimide membranes by thermal treating and UV crosslinking for selective hydrogenation reactions such as selective hydrogenation of propadiene and propyne and selective hydrogenation of butadiene include: 1) taking advantage of the catalytic membrane reactor concept by combining chemical reactions with the catalytic and separation activities of the membranes; 2) controllable $H_2$ concentration; 3) adjustable $H_2$/feed ratio, etc. These advanced characteristics will improve the reaction yield and selectivity simultaneously for selective hydrogenation reactions.

Yet another application of the new polymer membranes prepared from the aromatic polyimide membranes by thermal treating and UV crosslinking described in the current invention is as the novel efficient proton-conducting membrane for fuel cell application. The development of efficient proton-conducting membrane is of the greatest importance for the design and improvement of low-temperature fuel cells including proton exchange membrane fuel cells (PEMFCs) and direct methanol fuel cells (DMFCs). PEMFC is one of the most attractive power sources for a variety of applications by virtue of its high efficiency and environment friendly nature. During the past two decades most of the activity in the field of proton-conducting membranes has been undertaken by the materials science community whose major motivation has been to develop suitable proton conducting materials for application as proton conducting membranes for fuel cells. The breakthrough of the PEMFC and DMFC technologies has been however still inhibited, mainly due to the lack of suitable materials for proton-conducting membrane applications. Optimized proton and water transport properties of the membrane are crucial for efficient fuel cell operation. Dehydration of the membrane reduces proton conductivity while excess of water can lead to flooding of the electrodes, both conditions may result in poor cell performance.

The new polymer membranes prepared from the aromatic polyimide membranes by thermal treating and UV crosslinking described in the current invention are expected to exhibit significantly improved performance as proton-conducting membranes for fuel cell applications compared to traditional Nafion® polymer membranes because of their excellent proton conducting property, high water adsorption capacity, and high chemical and thermal stability.

In summary, the high performance new polymer membranes prepared from the aromatic polyimide membranes by thermal treating and UV crosslinking of the present invention are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

EXAMPLES

The following examples are provided to illustrate one or more preferred embodiments of the invention, but are not limited embodiments thereof. Numerous variations can be made to the following examples that lie within the scope of the invention.

Example 1

Synthesis of Poly(BTDA-APAF) Polyimide

An aromatic poly[3,3',4,4'-benzophenonetetracarboxylic dianhydride-2,2-bis(3-amino-4-hydroxyphenyl)-hexafluoropropane] (poly(BTDA-APAF)) polyimide containing UV cross-linkable carbonyl groups and pendent —OH functional groups ortho to the heterocyclic imide nitrogen in the polymer backbone was synthesized from 2,2-bis(3-amino-4-hydroxyphenyl)-hexafluoropropane diamine (BTDA) and 3,3',4,4'-benzophenonetetracarboxylic dianhydride (APAF) in NMP polar solvent by a two-step process involving the formation of the poly(amic acid) followed by a solution imidization process. Acetic anhydride was used as the dehydrating agent and pyridine was used as the imidization catalyst for the solution imidization reaction. For example, a 250 mL three-neck round-bottom flask equipped with a nitrogen inlet and a mechanical stirrer was charged with 10.0 g (27.3 mmol) of APAF and 40 mL of NMP. Once the APAF was fully dissolved, a solution of BTDA (8.8 g, 27.3 mmol) in 40 mL of NMP was added to the APAF solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 hour at 80° C. to yield the poly(BTDA-APAF) polyimide. The poly(BTDA-APAF) polyimide product in a fine fiber form was recovered by slowly precipitating the reaction mixture into a large amount of methanol. The resultant poly (BTDA-APAF) polyimide fibers were then thoroughly rinsed with methanol and dried in a vacuum oven at 150° C. for 24 hours.

Example 2

Preparation of Poly(BTDA-APAF) Polyimide Polymer Membrane

The poly(BTDA-APAF) polyimide polymer membrane was prepared as follows: 4.0 g of poly(BTDA-APAF) polyimide synthesized in Example 1 was dissolved in a solvent mixture of 12.0 g of NMP and 12.0 g of 1,3-dioxolane. The mixture was mechanically stirred for 2 h to form a homogeneous casting dope. The resulting homogeneous casting dope was allowed to degas overnight. The poly(BTDA-APAF) polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(BTDA-APAF) polymer membrane (abbreviated as BTDA-APAF membrane).

Example 3

Preparation of New Polymer Membrane from BTDA-APAF Membrane by Thermal Treatment and UV Crosslinking The BTDA-APAF membrane prepared in Example 2 was thermally heated from 50° to 450° C. at a heating rate of 5° C./min under $N_2$ flow. The membrane was hold for 1 h at 450° C. and then cooled down to 50° C. at a heating rate of 5° C./min under $N_2$ flow. The heat-treated BTDA-APAF membrane was then exposed to UV radiation using 254 nm wavelength UV light generated from a UV lamp with 1.9 cm (0.75 inch) distance from the membrane surface to the UV lamp and a radiation time of 20 minutes at 50° C. The UV lamp that was used was a low pressure, mercury arc immersion UV quartz 12 watt lamp with 12 watt power supply from Ace Glass Incorporated. The heat-treated and then UV crosslinked new membrane was abbreviated as BTDA-APAF-HT-UV membrane.

Example 4

$CO_2/CH_4$ Separation Performance of BTDA-APAF Membrane and BTDA-APAF-HT-UV Membrane The BTDA-APAF membrane and the BTDA-APAF-HT-UV membrane were tested for $CO_2/CH_4$ separation under testing temperature of 50° C. (Table 1). The BTDA-APAF-HT-UV membrane was also tested at 100° C. It can be seen from Table 1 that the BTDA-APAF-HT-UV membrane showed significantly increased $CO_2/CH_4$ selectivity and $CO_2$ permeability compared to the untreated BTDA-APAF membrane at 50° C. testing temperature. In addition, the BTDA-APAF-HT-UV membrane also showed good performance at 100° C. high testing temperature. These results suggest that the BTDA-APAF-HT-UV membrane is a good candidate for $CO_2/CH_4$ separation.

TABLE 1

Pure gas permeation test results of BTDA-APAF membrane and BTDA-APAF-HT-UV membrane for $CO_2/CH_4$ separation

| Membrane | $P_{CO2}$ (Barrer) | $\alpha_{CO2/CH4}$ |
|---|---|---|
| BTDA-APAF membrane[a] | 5.92 | 32.5 |
| BTDA-APAF-HT-UV[a] | 219.5 | 48.4 |
| BTDA-APAF-HT-UV[b] | 325.3 | 19.7 |

[a]$P_{CO2}$ and $P_{CH4}$ were tested at 50° C. and 690 kPa (100 psig);
[b]$P_{CO2}$ and $P_{CH4}$ were tested at 100° C. and 690 kPa (100 psig);
1 Barrer = $10^{-10}$ cm$^3$(STP) · cm/cm$^2$ · sec · cmHg.

Example 5

$H_2/CH_4$ Separation Performance of BTDA-APAF Membrane and BTDA-APAF-HT-UV Membranes The BTDA-APAF membrane and the BTDA-APAF-HT-UV membrane were tested for $H_2/CH_4$ separation under testing temperatures of 50° C. (Table 2). It can be seen from Table 2 that the BTDA-APAF-HT-UV membrane showed significantly increased $H_2$ permeability and maintained $H_2/CH_4$ selectivity compared to the untreated BTDA-APAF membrane. These results suggest that the BTDA-APAF-HT-UV membrane is a good candidate for $H_2/CH_4$ separation.

TABLE 2

Pure gas permeation test results of BTDA-APAF membrane and BTDA-APAF-HT-UV membrane for $H_2/CH_4$ separation[a]

| Membrane | $P_{H2}$ (Barrer) | $\alpha_{H2/CH4}$ |
|---|---|---|
| BTDA-APAF membrane | 24.6 | 134.9 |
| BTDA-APAF-HT-UV | 604.7 | 133.2 |

[a]$P_{H2}$ and $P_{CH4}$ were tested at 50° C. and 690 kPa (100 psig);
1 Barrer = $10^{-10}$ cm$^3$(STP) · cm/cm$^2$ · sec · cmHg.

Comparable Examples

Five process simulation examples were studied to compare the new high performance BTDA-APAF-HT-UV membrane with the commercially available membranes. Comparable Example 1 was a single stage system using the currently commercially available membranes. Comparable Examples 2 and 3 were a single stage system using the new BTDA-APAF-HT-UV membrane listed in Table 1. Comparable Example 1 and Example 2 were operated at feed temperature of 50° C. In order to have a sufficient dew point margin preventing liquid condensation on the membrane surface during the operation, a pretreatment regenerable adsorbent system called MemGuard™ that uses molecular sieves developed by UOP, was applied in these two examples. Comparable Example 3 was operated at high feed temperature of 100° C. due to the high thermal and mechanical stability of the new BTDA-APAF-HT-UV membrane. Since sufficient dew point margin was provided by operating the membrane system at the high temperature, no pretreatment system was required in Comparable Example 3.

In order to improve the recovery of hydrocarbons from the natural gas stream, a two-stage membrane system was studied. In Comparable Example 4, commercially available membranes were used for both first and second stages. A pretreatment system such as MemGuard™ would be required for Comparable Example 4. In Comparable Example 5, new BTDA-APAF-HT-UV membrane was used for both first- and second-stage membranes. Comparable Example 5 operated the first stage at an elevated temperature to provide a sufficient dew point margin for the product gas. No pretreatment system was required for Comparable Example 5. The second stage of Comparable Example 5 was operated at 50° C. feed temperature to increase the membrane selectivity, hence, reduce the hydrocarbon loss. Since heavy hydrocarbons are hard to reach second stage feed, the pretreatment unit such as MemGuard™ was not required.

Comparable Examples 1, 2, and 3 assumed a natural gas feed with 8% $CO_2$, and the product spec for $CO_2$ is at 2%. In Comparable Example 1, the commercially available membrane was assumed to be a membrane with typical performance in the current natural gas upgrading market. In Comparable Examples 2 and 3, the new BTDA-APAF-HT-UV membrane material was used to make the membrane with a thickness of 200 nm. The permeance of the new BTDA-APAF-HT-UV membrane was assumed at 0.030 m$^3$(STP)/m$^2$·h·kPa at 50° C. and 0.044 m$^3$(STP)/m$^2$·h·kPa at 100° C. based on the permeability measured for the dense membrane, and the selectivities were assumed at 44 at 50° C. and 15 at 100° C., which are lower than the selectivities shown in Table 1. A process simulation based on the above performance was performed for Comparable Examples 1, 2 and 3. The results are shown in Table 3.

TABLE 3

Simulation Results for Comparable Examples 1, 2 and 3

| | Comparable Example 1 | Comparable Example 2 | Comparable Example 3 |
|---|---|---|---|
| Feed Flow, m³(STP)/h | $5.9 \times 10^5$ | $5.9 \times 10^5$ | $5.9 \times 10^5$ |
| CO2 in Feed, % | 8 | 8 | 8 |
| CO2 in Product Required, % | 2 | 2 | 2 |
| MemGuard ™ Required? | Yes | Yes | No |
| Membrane Feed Temperature, °C. | 50 | 50 | 100 |
| Membrane Feed Pressure, kPa | 3792.3 | 3792.3 | 3792.3 |
| Membrane Area Saved, % | — | 59.8 | 82.6 |
| Total Hydrocarbon Recovery, % | Base | 7.4 | −2.8 |

It can be seen by comparing the above examples that Comparable Example 2 showed significant cost saving (59.8% less membrane area required) and higher hydrocarbon recovery (7.4% more) compared to Comparable Example 1. Comparable Example 3 not only can save the membrane area (82.6%), but also can eliminate the costly MemGuard™ pretreatment system at slightly lower hydrocarbon recovery. It is anticipated that the new BTDA-APAF-HT-UV membrane system will significantly reduce the membrane system cost and footprint which is extremely important for large offshore gas processing projects.

The hydrocarbon recovery can be increased by running a two stage membrane system as shown in Comparable Examples 4 and 5. In Comparable Example 4, both stages applied the commercially available membranes with the performance data the same as those in Comparable Example 1. In Comparable Example 4, the new BTDA-APAF-HT-UV membrane was used for both first stage and second stage. The first stage was operated at elevated temperature to eliminate the MemGuard™ system. The second stage was operated at lower temperature to increase the selectivity. The natural gas feed in Comparable Examples 3 and 4 had been changed to 45% $CO_2$ (more meaningful for a two-stage system), and the product specification for $CO_2$ in these two examples were assumed at 8%. Table 4 shows the results of the simulation for Comparable Examples 4 and 5.

TABLE 4

Simulation Results for Comparable Examples 4 and 5

| | Comparable Example 4 | Comparable Example 5 |
|---|---|---|
| Feed Flow, m³(STP)/h | $5.9 \times 10^5$ | $5.9 \times 10^5$ |
| $CO_2$ in Feed, % | 45 | 45 |
| $CO_2$ in Product Required, % | 8 | 8 |
| Pretreatment required? | Yes | No |
| 1$^{st}$ Stage Membrane Feed Temperature, °C. | 50 | 100 |
| 1$^{st}$ Stage Membrane Feed Pressure, kPa | 3792.3 | 3792.3 |
| 2$^{nd}$ Stage Membrane Feed Temperature, °C. | 50 | 50 |
| 2nd Stage Membrane Feed Pressure, kPa | 3902.6 | 3902.6 |
| 1$^{st}$ Stage Membrane area | Base | 20.5% |
| 2$^{nd}$ Stage Membrane area | Base | 40.8% |
| Total Compressor Horse Power | Base | 107.5% |
| Total Hydrocarbon Recovery, % | 96.9 | 97.1 |

It can be seen from Table 4 that Comparable Example 4 and Comparable Example 5 have very similar hydrocarbon recovery. Due to the high temperature operation for the first stage membrane, Comparable Example 5 does not require a pretreatment such as a MemGuard™ system, which is about 10 to 40% of the total cost of Comparable Example 4. At the same time, the first stage membrane area is reduced by 79.5% and the second stage membrane area is reduced by 59.2% from Comparable Example 4 to Comparable Example 5. It can be expected that the Comparable Example 5 will have a big capital (>50%) and footprint (>50%) saving compared to Comparable Example 4. The only drawback is that the compressor will be slightly bigger. Table 4 shows a 7.5% horse power increase from Comparable Example 4 to Comparable Example 5.

The invention claimed is:

1. A method for making polymer membranes from aromatic polyimide membranes by thermal treating and UV crosslinking comprising:
    a) first providing or synthesizing a polyimide polymer wherein said polyimide polymer contains pendent —OH or —SH groups ortho to a heterocyclic imide nitrogen and UV cross-linkable functional groups in a polymer backbone;
    b) fabricating polyimide membranes from the polyimide polymer;
    c) heating the polyimide membranes at a temperature between about 300° and 600° C. under inert atmosphere or vacuum for about 30 seconds to one hour to produce a heated polyimide membrane; and
    d) exposing said heated polyimide membranes to a crosslinking treatment;

wherein said polyimide polymer has a structure represented by a plurality of first repeating units of a formula (I), wherein said formula (I) is:

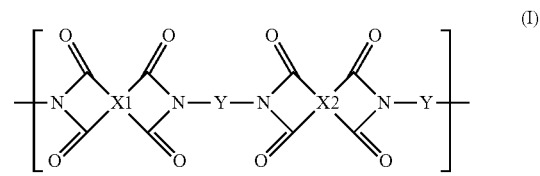

where -$X_1$- of said formula (I) is

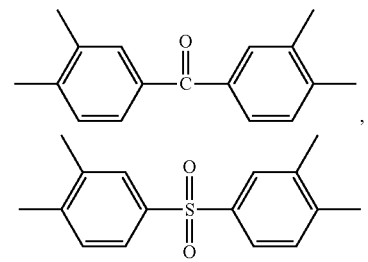

or mixtures thereof, -$X_2$- of said formula (I) is selected from

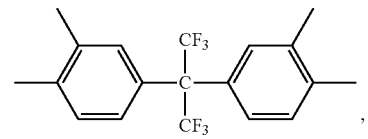

-continued

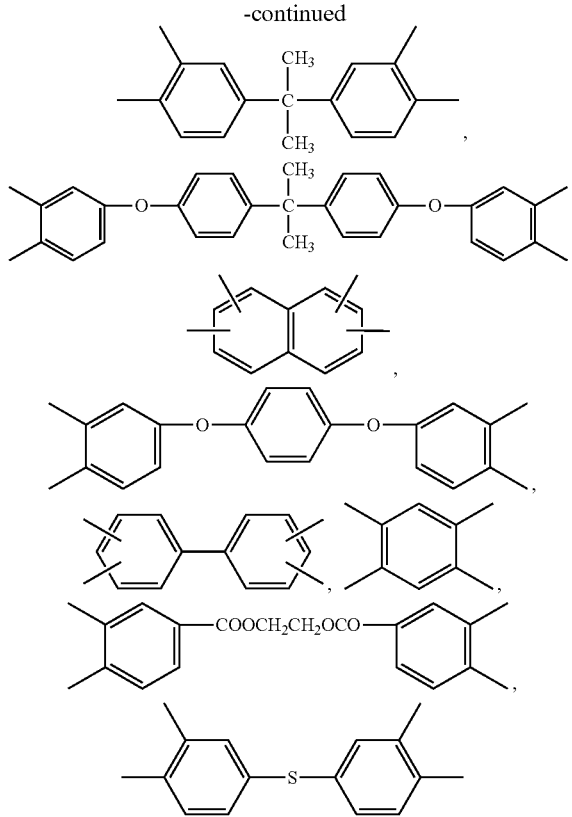

or mixtures thereof, -Y- of said formula (I) is

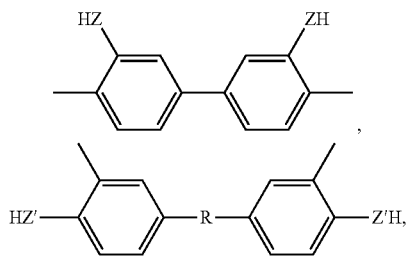

-continued

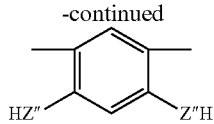

or mixtures thereof, —Z—, —Z'—, and —Z"— are independently —O— or —S—, —R— is

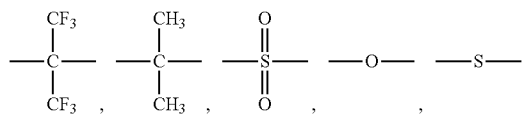

or mixtures thereof.

2. The method of claim 1 further comprising coating a top surface of the polymer membranes made from aromatic polyimide membranes by thermal treating and UV crosslinking with a thin layer of high permeability material selected from the group consisting of a polysiloxane, a fluoro-polymer, a thermally curable silicone rubber, and a UV radiation curable epoxy silicone.

3. The method of claim 1 wherein said polyimide polymer is selected from the group consisting of poly[3,3',4,4'-benzophenonetetracarboxylic dianhydride-2,2-bis(3-amino-4-hydroxyphenyl)-hexafluoropropane] (poly(BTDA-APAF)), poly(3,3',4,4'-benzophenonetetracarboxylic dianhydride-3,3'-dihydroxy-4,4'-diamino-biphenyl) (poly(BTDA-HAB)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

* * * * *